RECORDING DEVICES

Filed June 23, 1959

INVENTOR.
PETER G. S. MERO
BY Thomas E. Dorn

United States Patent Office 2,986,601 Patented May 30, 1961

2,986,601

RECORDING DEVICES

Peter G. S. Mero, 830 Mount Pleasant, Winnetka, Ill.

Filed June 23, 1959, Ser. No. 822,223

4 Claims. (Cl. 178—18)

This invention relates to record communication systems and particularly to apparatus for bringing a recording medium, such as a web of paper, into and out of contact with a stylus in a graphic communication system of the kind in which data is transcribed manually at one station and is automatically reproduced at another station.

In a graphic communication system, a message or other data, such as a sketch, is written or drawn by hand upon a sheet of paper or the like at the transmitter, using a stylus which may resemble a pen or pencil insofar as size and shape are concerned. The stylus is connected to a translating apparatus which develops electrical control signals representative of the movements of the stylus. For example, the translating apparatus may be of the kind described in Patent No. 2,583,535 of Robert Adler, issued January 29, 1952, and in Patent No. 2,649,503 of Robert Adler, issued August 18, 1953. At the receiver of the system, the signals are used to control movements of another stylus, relative to a recording medium, to reproduce the same data as is transcribed manually at the transmitter.

In a system of this kind, the paper or other recording medium should be held almost completely flat on a writing surface in order to avoid errors and distortions in the operation of the receiver apparatus. Thus, buckling, wrinkling, or twisting of the paper is highly undesirable. Accuracy of reproduction is further complicated, in conventional systems, by the fact that the reproducing stylus is required to move in accordance with a three-dimensional set of co-ordinates. That is, the stylus must move into and out of contact with the recording medium, usually a sheet of paper, as well as to move in any desired direction across the medium. As a consequence, it is frequently difficult to construct an operating linkage for the stylus, particularly a receiving stylus, which is sufficiently accurate in reproducing the movements of a transmitter stylus, especially when those movements are rapid and irregular as frequently occurs in the case of signatures and other handwriting, and at the same time is strong and rugged enough for normal office duty.

It is a primary object of the invention, therefore, to substantially reduce the number of movements required of a receiver stylus in a graphic communication system without detracting from the accuracy and speed of image or data reproduction.

A particular object of the invention is to eliminate the need for movement of the stylus, in a graphic communication receiver, in bringing the stylus into and out of contact with a recording medium.

Another object of the invention is to provide a new and improved system for moving a recording medium of web form into and out of contact with a recording stylus, in a graphic communication receiver, which is effective to hold the recording medium in flat relation upon a writing surface.

A further object of the invention is to provide for the use of a relatively strong and rugged stylus mounting arrangement, in the receiver of a graphic communication system, and at the same time to afford rapid and accurate reproduction of data upon an ordinary web of paper of similar recording medium.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

Figure 1:
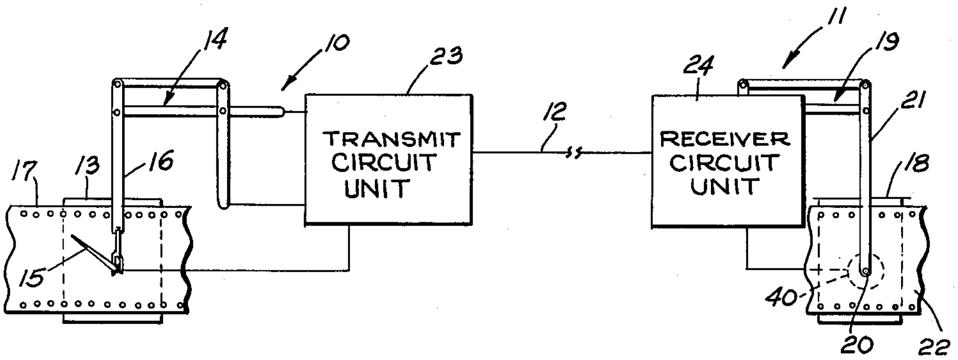
Fig. 1 is a simplified, primarily schematic view of a graphic communication system including a receiver constructed in accordance with the invention.

The graphic communication system illustrated in Fig. 1 comprises two communication stations 10 and 11 which are electrically connected or otherwise coupled to each other as by a transmission line 12. It should be understood that a radio transmission link or other coupling arrangement may be substituted for the transmission line. The station 10, in the illustrated system, is a transmitter, whereas the station 11 is a receiver.

The transmitter 10 includes a writing surface 13 which is usually of planar configuration. A suitable recording medium 17, usually a web of paper, may be disposed upon the writing surface 13. The station 10 further includes a writing instrument comprising a stylus or pen 15 which is supported upon an arm or link 16. The support link 16 constitutes a part of the transmitter apparatus and may comprise one member of a parallel linkage system 14 in a translating apparatus of the kind described in the aforementioned Patent No. 2,583,535 of Robert Adler.

The receiver 11 is, in many respects, essentially similar in construction to station 10, and includes a writing surface 18 which is also a planar surface. As in the case of the transmitter 10, the writing surface 18 may be utilized to support a suitable recording medium 22, usually a web of paper or similar material, in position to be engaged by a writing head or stylus 20. The stylus 20 is mounted upon a support arm or link 21 which comprises one member of a translating mechanism 19 which is most respects is similar to that utilized at the transmitter 10. The transmitter unit 10 further includes suitable electrical circuits for translating movements of the stylus or pen 15 into electrical control signals which are transmitted over the line 12 or other coupling link to the receiver 11. The receiver 11, on the other hand, includes suitable circuits and devices 24 for actuating the linkage 19 to move the stylus 20 transversely of the writing surface to reproduce information thereon in response to the control signals transmitted from the transmitter 10. The electrical circuits and signal-transmitting devices for the transmitter and receiver may be of known construction, particularly as described in the aforementioned Adler patents, and therefore need not be set forth specifically herein.

Figure 2:
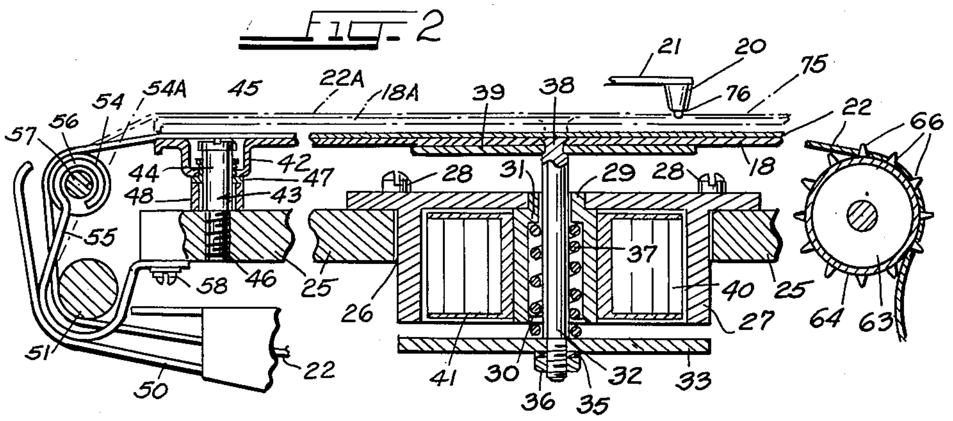
Fig. 2 is a detail view, partly in cross section, of the data-reproducing mechanism of a graphic communication receiver constructed in accordance with a preferred embodiment of the invention.
Figure 3:
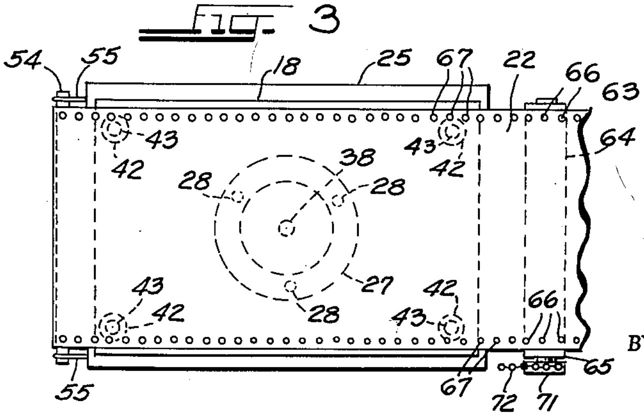
Fig. 3 is a simplified plan view of the mechanism of Fig. 2.

Figs. 2 and 3 illustrate, in substantial detail, the data-reproducing mechanism of the graphic communication receiver 11. The apparatus shown therein comprises a base member 25 which is utilized to support the writing surface or platen member 18. The base member 25 is provided with a central aperture 26 within which a solenoid housing 27 is suspended, the housing 27 being affixed to the base member 25 by suitable means such as a plurality of screws 28. A cylindrical core member 29 is mounted at the center of the housing 27. The core member 29 has a central bore 30 having a shoulder portion 31 at one end thereof. An armature 32 is mounted within the bore 30 and extends outwardly thereof at both ends of the bore. On the lower end of the armature 32, a stop plate 33 is mounted on the armature by suitable means such as a lock washer 35 and a nut 36. A biasing spring 37 is mounted within the bore 30, one end of the spring engaging the stop plate and the other end of the spring abutting the shoulder 31.

The platen 18 is mounted upon the upper end of the armature 32, this end of the armature preferably comprising a rivet portion 38. A reinforcing plate 39 may also be mounted on the upper end of the armature 32 to strengthen the central portion of the platen 18. After the platen 18 has been securely riveted on the armature 32, as illustrated in Fig. 2, the rivet portion 38 of the armature should be finished to afford a smooth continuous surface with the upper surface of the platen 18. A solenoid 40 is mounted within the housing 27 in encompassing relation to the core portion 31 of the housing and hence in encompassing relation to the armature 32. The coil 40 may be disposed within an insulator support member 41, which may be glued or otherwise secured to the core portion 31 of the solenoid housing 27. The solenoid 40 is electrically connected to the receiver circuit unit 24 to afford an energizing circuit for the solenoid, as indicated in Fig. 1.

At the four corners of the platen 18, the platen is provided with a series of wells or recesses 42 for receiving a corresponding number of guide members 43 (See Fig. 3). One of the guide structures is shown in detail in Fig. 2. As shown therein, the guide member 43 comprises a stud having an upper shank 44 with a head 45 and having a lower portion 46 which is threaded into a suitable tapped opening in the base member 25. The recessed portion 42 of the platen 18 is provided with a central opening which encompasses the shank 44 of the guide member 43. Preferably, a bushing 47 is interposed between the recessed portion 42 of the platen and the shank 44 of the guide member. The bushing 47 may be fabricated from nylon or from other suitable material to afford a sliding bearing capable of long life without requiring lubrication. A bushing 48 may be mounted upon the shank 44 between the bushing 47 and the upper surface of the base member 25 to determine the initial mounting position of the platen 18.

The data-reproducing apparatus may further include a guide chute 50 through which the paper web 22 extends, the web originating at a suitable supply roll (not shown). The paper web 22 extends over a guide member 51, which may comprise a fixed bar or may constitute a roller, and over a floating roll 54. The roll 54 is not mounted in a fixed position, but rather is supported by means which permit limited movement of the roll in virtually any direction. Thus, the floating roll 54 is supported at its opposite ends by means of a pair of wire springs 55, which constitute mounting brackets for the roll. One of the springs 55 is shown in detail in Fig. 2. As seen therein, the upper end of the spring 55 is provided with a hook-shaped portion 56 which engages a reduced-diameter portion 57 of the floating roll 54. The end of the spring 55 opposite the floating roll 54 is bent in a manner such that the main portion of the spring is of substantially U-shaped configuration. Each of the springs 55 may be secured to the base member 25 by suitable mounting means such as the screw 58.

As shown in Figs. 2 and 3, the paper web 22 is extended around the guide member 51, over the floating roll 54, and across the upper surface of the platen 18. At the end of the platen 18 opposite the floating roll 54, there is located a paper feed roll 64. The feed roll 64 is provided, at its opposite ends, with a pair of feed sprockets 63 and 65 each having a plurality of teeth 66 for engaging in suitable perforations 67 in the paper web 22. One end of the feed roll may be provided with a sprocket 71 (Fig. 3) in which a drive chain 72 may be engaged to afford a means for rotating the paper feed roll 64 to pull the paper web 22 across the platen 18. A preferred construction for the paper feed roll 64 is described in substantial detail in the co-pending application of Peter G. S. Mero, Serial No. 822,236 filed concurrently with.

The general mode of operation of the apparatus illustrated in Figs. 1–3 is substantially conventional. That is, the movements of the transmitter stylus 15 across the recording medium 17 are translated into electrical signals, by means of the linkage 14 and the circuit unit 23. These electrical signals are transmitted over the line or other communication link 12 to the receiver circuit unit 24 and are employed to actuate the linkage 19 and thus control the movement of the stylus 20 across the paper web 22.

The vertical movements of the stylus 15, the movements into and out of contact with the paper 17, are handled differently, however. Provision is made in the transmitter 10 to generate an electrical signal indicative of movements of the stylus 15 into and out of contact with the recording medium 17. The signal translating arrangement employed for this purpose may, for example, be of the kind described in the co-pending application of Myron L. Anthony, Serial No. 736,317, filed May 19, 1958. In the receiver 11, however, the stylus 20 remains in fixed position, insofar as movement toward and away from the paper web 22 is concerned. Thus, movements of the stylus are restricted to a given writing plane 75. Instead of moving the stylus in the receiver, the solenoid 40 is utilized to move the platen 18 toward and away from the stylus to bring the paper web 22 into and out of contact with the stylus.

In Fig. 2, the recording mechanism is illustrated in its unactuated or non-recording position. That is, the platen 18 and the recording medium 22 are displaced from the writing plane 75 in which the writing tip 76 of the stylus 20 is located. The position shown in solid lines in Fig. 2 corresponds to an operating condition in which the stylus 15 is held out of contact with the recording medium 17 at the transmitter 10.

When the stylus 15 is moved into contact with the recording medium 17, an electrical signal is transmitted from the transmitter 10 to the receiver 11. This electrical signal controls an operating circuit which energizes the solenoid 40. When the solenoid 40 is energized, it drives the armature 32 upwardly, against the biasing force which is afforded by the spring 37 and in a direction substantially normal to the writing plane 75, and thus moves the platen 18 and the paper web 22 upwardly until the paper web is contacted by the writing tip 76 of the stylus 20. The upward movement of the platen 18 is guided by the engagement of the platen wells 42 and the bushings 47 with the four guide studs 43, so that the platen is not tilted but remains substantially parallel to the plane 75. When the transmitter stylus 15 is moved out of contact with the recording medium 17, the solenoid 40 is de-energized and the platen 18 is returned to its original position by the biasing spring 37 operating upon the stop plate 33 on the armature 32. Thus, the receiver stylus 20 is required to move only in two coordinate directions parallel to the writing plane 75 and does not move in a direction transverse to the plane. Instead, this movement is accomplished by movement of the platen 18, permitting more rugged and durable construction of the stylus control linkage 19 and minimizing adjustment difficulties with regard to movement of the stylus and recording medium into and out of contact with each other.

When the solenoid 40 is energized and the platen 18 is moved to its writing position as indicated by the phantom outline 18A, the paper web 22 is of course pulled upwardly to the position 22A (Fig. 2). This movement has a tendency to pull the web over the floating roll 54 and to produce slack in the paper web. If a fixed roll is used, instead of the floating roll 54, the resultant slack in the paper web almost inevitably causes buckling or wrinkling of the paper web when the platen 18 is subsequently moved to its original or non-recording position. Repeated operation of the platen moving system, under these conditions, may produce substantial distortion in the reproduced data and may prevent reproduction of data at the receiver 11 almost completely. With the apparatus shown in Figs. 2 and 3, however, this difficulty is eliminated by the use of the floating roll 54. Thus, when the platen 18 is moved upwardly to its recording position 18A, the roll 54 is pulled toward the platen to the position 54A. The resilient mounting of the floating roll is constructed to provide for movement of the roll 54 rather than pulling of the paper 22 when the platen is raised; that is, the resilient spring brackets 55 are deformable under less pulling force than required to advance the paper web 22. Consequently, no slack is introduced into the paper web when the platen is elevated, and the resiliently mounted floating roll 54 pulls the paper tight across the platen 18 whenever the platen is lowered to its initial position. Thus, the floating roll 54 is especially advantageous in that it avoids buckling and wrinkling of the web 22 which would otherwise be caused by the vertical movements of the platen 18. The floating roll also prevents other difficulties which might arise from twisting of the paper web or from misregistration in the two groups of feed apertures 67 (see Fig. 3), as described more fully in the aforementioned co-pending application of Peter G. S. Mero.

Hence, while I have illustrated and described the preferred embodiments of my invention, it is to be understood that these are capable of variation and modification.

I claim:

1. In a graphic communication system in which a first electrical signal representative of movement of a transmitter stylus transversely to a writing surface and a second electrical signal representative of movement of said transmitter stylus substantially normal to said writing surface are transmitted from a transmitter to a receiver, a receiver unit comprising: a receiver stylus member mounted for movement, in a given writing plane, over a predetermined writing area; means for moving said receiver stylus in said writing plane in response to said first electrical signal; a platen, having a writing surface parallel to said writing plane; and means, responsive to said second signal, for moving said platen toward and away from said stylus member, in a direction substantially normal to said writing plane.

2. In a graphic communication system in which a first electrical signal representative of movement of a transmitter stylus transversely to a writing surface and a second electrical signal representative of movement of said transmitter stylus substantially normal to said writing surface are transmitted from a transmitter to a receiver, a receiver unit comprising: a receiver stylus member mounted for movement, in a given writing plane, over a predetermined writing area; means for moving said receiver stylus in said writing plane in response to said first electrical signal; a platen, having a writing surface parallel to said writing plane; means for moving said platen toward and away from said stylus member, in a direction substantially normal to said writing plane, said means comprising a solenoid having an armature connected to said platen and means for normally biasing said armature toward a first position in which said platen is displaced from said writing plane; and means, responsive to said second signal, for energizing said solenoid to move said armature and said platen, against the biasing force exerted by said biasing means, to a second position in which said platen writing surface is substantially coincident with said writing plane.

3. In a graphic communication system in which a first electrical signal representative of movement of a transmitter stylus transversely to a writing surface and a second electrical signal representative of movement of said transmitter stylus substantially normal to said writing surface are transmitted from a transmitter to a receiver, a receiver unit comprising: a receiver stylus member mounted for movement, in a given writing plane, over a predetermined writing area; means for moving said receiver stylus in said writing plane in response to said first electrical signal; a platen, having a writing surface parallel to said writing plane; means responsive to said second signal, for moving said platen toward and away from said stylus member between a first position in which said platen is displaced from said stylus and a second position in which said platen writing surface is substantially coincident with said writing plane; and independent guide means for limiting movement of said platen to a direction normal to said writing plane.

4. In a graphic communication system in which a first electrical signal representative of movement of a transmitter stylus transversely to a writing surface and a second electrical signal representative of movement of said transmitter stylus substantially normal to said writing surface are transmitted from a transmitter to a receiver, a receiver unit comprising: a receiver stylus member mounted for movement, in a given writing plane, over a predetermined writing area; means for moving said receiver stylus in said writing plane in response to said first electrical signal; a platen, having a writing surface parallel to said writing plane; means, responsive to said second signal, for moving said platen toward and away from said stylus member, in a direction substantially normal to said writing plane; and means for feeding a web of paper across said platen, in contact with said platen writing surface; said paper feeding means including at least one idler roll engaged with said paper web and resilient mounting means for normally maintaining said roll in a predetermined position relative to said platen but permitting both angular and translational movement of said roll relative to said platen in response to movement of said platen.

References Cited in the file of this patent

UNITED STATES PATENTS

| | | |
|---|---|---|
| 1,201,631 | Rowntree | Oct. 17, 1916 |
| 2,891,107 | Weingart | June 16, 1959 |